United States Patent [19]

van der Schoot

[11] Patent Number: 4,478,863

[45] Date of Patent: Oct. 23, 1984

[54] METHOD FOR STEAM PEELING PLANT PRODUCTS

[75] Inventor: Peter W. C. van der Schoot, Ouderkerk a/d IJssel, Netherlands

[73] Assignee: Goudsche Machinefabriek B.V., Gouda, Netherlands

[21] Appl. No.: 491,150

[22] Filed: May 4, 1983

Related U.S. Application Data

[60] Division of Ser. No. 400,311, Jul. 21, 1982, Pat. No. 4,393,756, which is a continuation of Ser. No. 235,368, Feb. 19, 1981, abandoned, which is a continuation of Ser. No. 104,990, Dec. 18, 1979, abandoned.

[30] Foreign Application Priority Data

Dec. 29, 1978 [NL] Netherlands .......................... 7812678

[51] Int. Cl.³ ............................................. A23N 7/00
[52] U.S. Cl. .................................... 426/482; 426/511
[58] Field of Search ............... 426/482, 481, 511, 510; 99/348, 467, 479, 483, 516, 584; 366/105, 220, 292, 293, 314, 102, 103; 126/369

[56] References Cited

U.S. PATENT DOCUMENTS 3,334,575  8/1967  Erwin ..................................... 99/348
4,091,722  5/1978  Kunz ..................................... 99/584

*Primary Examiner*—George Yeung
*Attorney, Agent, or Firm*—Sprung Horn Kramer & Woods

[57] ABSTRACT

A method for steam peeling a plant product selected from the group consisting of potatoes, carrots, celery, red beets, Swedish turnips and apples in a substantially cylindrical peeling vessel having a product opening at one end and a liquid discharge outlet at the other end. In the peeling vessel there is disposed a partition or grid at the liquid discharge outlet end perpendicular to the longitudinal axis thereof and spaced from the liquid discharge outlet. The partition prevents passage of product to be peeled while allowing condensate to pass therethrough such that the product does not lie in the condensate during the application of steam. The steam is applied through an access opening in the vessel which is above the product level when the vessel is tilted around a horizontal axis into a normally operating longitudinally inclined position. In order to effect the peeling operation during the application of steam, stirring is carried out by at least one stirring arm disposed above the partitioning and axially along the wall of the vessel. The stirring arm rotates about the longitudinal axis of the vessel, when the vessel is in the normally operating position, to effect the peeling of the plant product. The vessel later tilts around a horizontal axis from the normally operating position until the other end is above the one end for discharging the peeled product through the product opening.

1 Claim, 4 Drawing Figures

METHOD FOR STEAM PEELING PLANT PRODUCTS

This is a division of application Ser. No. 400,311 filed July 21, 1982, now U.S. Pat. No. 4,393,756, which is a continuation of application Ser. No. 235,368, filed Feb. 19, 1981, now abandoned, which is a continuation of application Ser. No. 104,990, filed Dec. 18, 1979, now abandoned.

The invention relates to a steam peeling or cooking apparatus for plants, such as potatoes, carrots, celery, red beets, Swedish turnips, apples and the like, or for pulp, provided with a substantially cylindrical peeling vessel arranged rotatably about a horizontal shaft, having a supply or discharge opening disposed in one of the head faces, while the peeling vessel is furthermore provided with a steam supply or discharge opening.

In such an apparatus disclosed in applicants' Dutch patent application No. 76,11024 laid open to public inspection, the peeling vessel is rotatably mounted about the central axis. As a result, during operation with a rotating peeling vessel, the plant to be peeled is intensively contacted with the pressure medium, in casu the steam, and stirred up. In this apparatus the steam supply and discharge takes place via a hollow shaft aligned with the central axis, in connection with the rotation possibility of the peeling vessel. Furthermore the peeling vessel is arranged in a double frame in order to enable the above rotation and a tilting of the vessel for the discharge of the product.

It is the object of the invention to simplify this prior art apparatus in such a way that it becomes cheaper and likewise resulting in an increased safety of operation.

To this effect a steam peeling or cooking apparatus (to be referred to hereinafter as steam peeling apparatus) of the above described type, has the feature that the peeling vessel is provided with a stirring gear rotatable about the longitudinal axis. Said stirring gear may consist of one or more rotatable arms or blades. It has been experimentally found that the plant to be peeled is properly stirred up for effecting an intensive contact thereof with the steam, without causing damage to the plant.

In a further embodiment of the steam peeling apparatus according to the invention, the arms or blades may be secured to the rotatably mounted partition if in the other head face positioned opposite the said head face fitted with a supply or discharge opening, a closable discharge opening for the condensate is disposed and the portion adjacent the condensate discharge opening is separated from the other portion of the peeling vessel by a partition having one or more liquid passages, whereby the product and the condensate are kept separate.

The arms or blades may thereby be arranged adjacent the circumference of the peeling vessel, so that a minimal quantity of the plant to be peeled is in direct contact with the arms or blades.

Said partition may be designed as a grid, which is known per se.

Furthermore the steam supply or discharge opening may be disposed adjacent the top, and the supply or discharge opening of the peeling vessel and communicates via a curved tube section with a rotary coupling whose rotation axis is aligned with the axis of the trunnions. As a result a very simple tilting action is available for the peeling vessel for discharging the plant and the peels.

Another possibility consists in that if in the other head face, which is situated opposite the head face provided with said supply or discharge opening, there is provided a closable discharge opening for the condensate and the portion in situ of the condensate discharge opening is separated from the other portion of the peeling vessel by a partition having one or more liquid passages, the partition in this case, in the form of a grid has a stationary arrangement in the peeling vessel and the arms or blades are attached to a coupling arm connected to a rotary shaft.

Furthermore, the steam supply or discharge opening may be disposed adjacent the top and therefore adjacent the supply or discharge opening of the peeling vessel and, via a bent tube section, communicate with a hollow tube disposed beyond the centre of gravity of the vessel, which tube likewise serves as axis of rotation of the vessel. As a result, the peeling vessel, during tilting, is accelerated, respectively decelerated through gravity, thus requiring slight mechanical forces for executing the movement. Moreover, less bends and couplings are necessary, the wear is limited, while furthermore a quicker steam pressure reduction may take place.

Some embodiments of the steam peeling apparatus according to the invention will now be described, by way of example, with reference to the accompanying drawings wherein.

Figure 1:
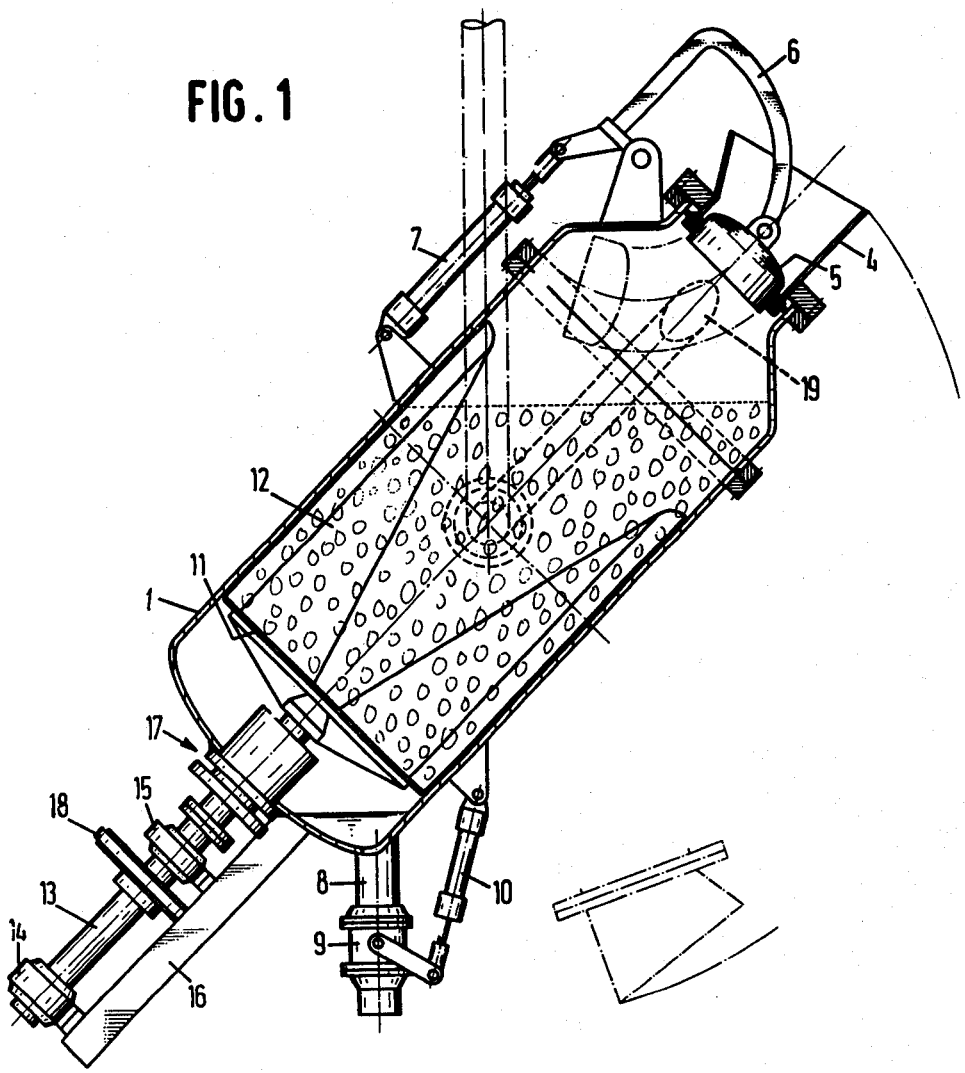
FIG. 1 is a partial cross-section of a side view of a steam peeling apparatus.
Figure 2:
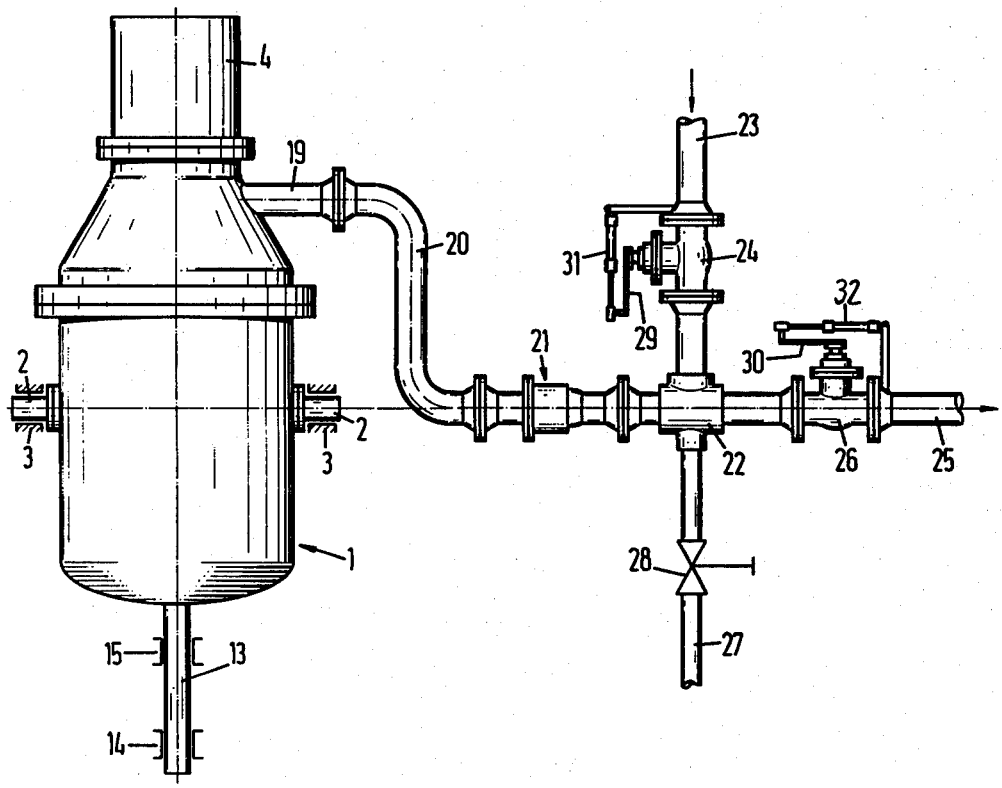
FIG. 2 is a front view of the apparatus shown in FIG. 1, with omission of some parts.

According to FIGS. 1 and 2 a steam peeling apparatus is provided with a peeling vessel 1 having trunnions 2 which are incorporated through bearings 3 in a stationary frame, not shown.

The peeling vessel is provided at the top with a supply or discharge funnel 4 for the plant. The closure of the funnel opening takes place by means of a cover 5 which may be operated by a piston-cylinder assembly 7 by means of a lever 6 which is rotatably connected to the vessel. As shown in FIG. 1 with dash-dotted lines, the cover 5 opens inwardly.

At the bottom the peeling vessel is provided for discharging condensate, sand and the like with a discharge 8 having a valve 9 which can be operated by the piston rod of a piston-cylinder assembly 10.

In the peeling vessel there is disposed a partition or grid 11 dividing the peeling vessel in two portions and which is provided with two blade-like upwardly extending arms 12. The grid is secured to the end of a shaft 13 arranged concentrically with the central axis of the vessel, which shaft extends through the bottom of the peeling vessel. The shaft 13 is supported by two bearings 14, 15 which are attached to a seating 16 connected to the peeling vessel. The sealing of the shaft 13 relative to the bottom of the peeling vessel takes place by means of a known stuffing box construction 17.

Between the two bearings 14 and 15 shaft 13 provided with a chain wheel 18 or the like through which the shaft 13 may be driven by a chain, not shown, which is connected to the output shaft of a motor.

As mainly appears from FIG. 2 the peeling vessel is provided at the top, adjacent the supply or discharge funnel 4, with a steam supply or discharge tube 19, which is connected to a rotary coupling 21 through interposition of a curved tube section 20. The latter coupling again communicates with a stationary manifold 22, communicating on the one end with a steam supply 23 having a ball tap 24 and on the other end a steam discharge 25 with a ball tap 26. Said manifold may furthermore be provided with a condensate discharge 27 fitted with valve 28. The ball taps 24 and 26, as shown in the embodiment, may be operated via a lever 29, 30 by a piston-cylinder assembly 31, 32 connected fixedly to the frame.

The operation of the apparatus seems clear after the above: After filling the vessel with potatoes or the like, the cover 5 and the valve 9 are closed. In closed position of the ball tap 26 and the valve 28, the ball tap 24 is opened for the supply of steam. After sufficient steam has been supplied, the ball tap 24 is closed.

The shaft 13 with the grid 11 and the arms or blades 12 can be kept in rotational movement during the entire cycle. The meanwhile formed condensate flows thereby downwards into the space underneath the grid, thus avoiding that the products are periodically immersed in the relatively cold condensate. After a specific, sufficiently longer period of time, the ball tap 26 is opened and the steam is let off. After this the valve 9 is opened for discharging the condensate. Subsequently the cylinder 7 is operated for opening the cover 5, after which the peeling vessel is tilted by means, not shown, until the funnel 4 has reached the position shown in FIG. 1 with dash-dotted lines, while meanwhile the plant and the peels are discharged slidingly. Hereafter the peeling vessel is returned to the starting position, after which the next cycle may be initiated.

By eliminating a number of functions relative to the apparatus disclosed in Dutch patent application No. 76,11024 of applicants, a shorter cycle period and a simplified control are obtained so that naturally also the costs of manufacture are reduced.

Moreover the protection is improved, while furthermore a more intensive turbulence of the plant is achieved. Another advantage is that a higher degree of filling is possible than is the case with the prior art apparatus.

Figure 3:
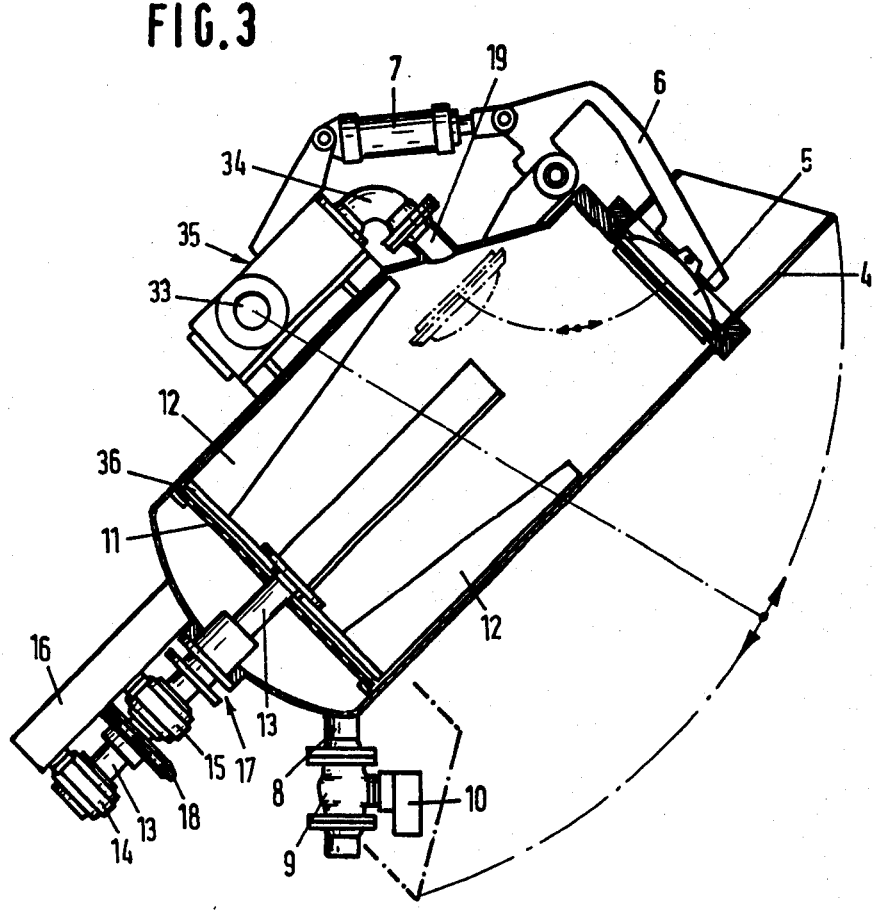
FIGS. 3 and 4 are views according to FIG. 1, respectively FIG. 2 of a second embodiment of the steam peeling apparatus according to the invention.
Figure 4:
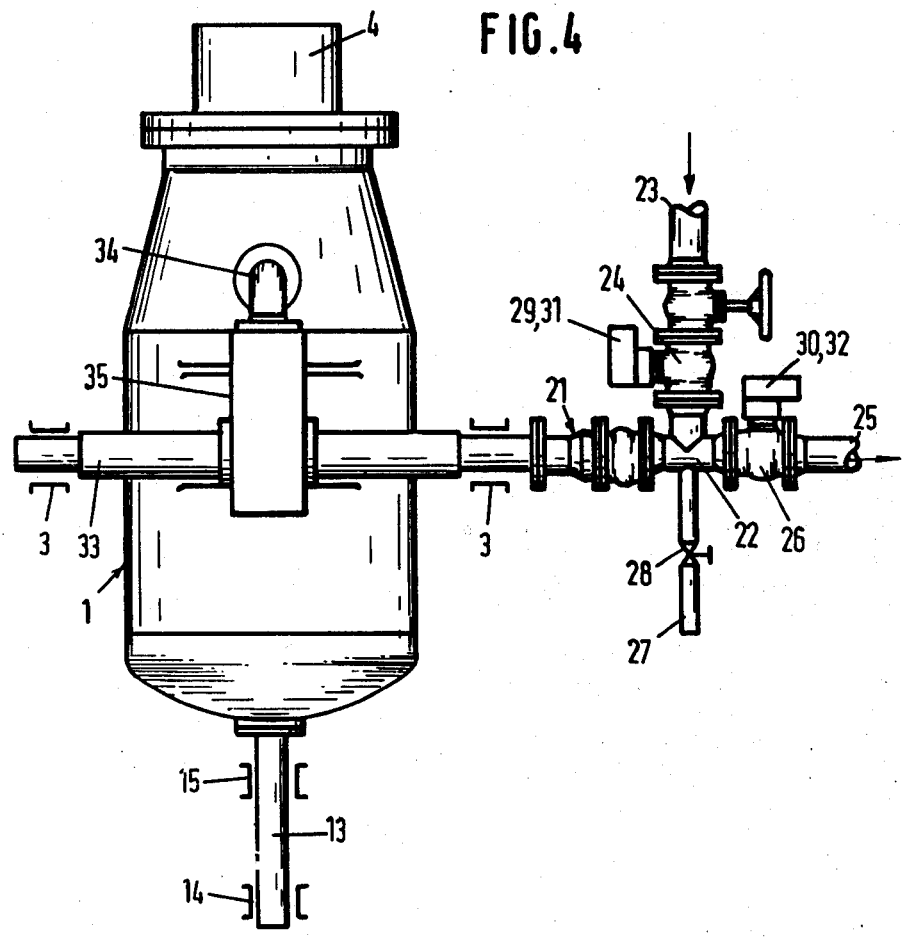

Of the second embodiment to be described by means of FIGS. 3 and 4, wherein the same parts are indicated by the same reference numerals, only those parts will be described that differ from those of the first embodiment.

In the second embodiment the suspension of the peeling vessel is changed in such a manner that the vessel during tilting is accelerated, respectively decelerated through gravity. As a result, smaller mechanical forces are required at the same time of motion for performing said motion. Said tilting takes place about a hollow shaft 33. To said hollow shaft connects a bend 34 via which steam may be supplied to or discharged from the vessel. This has the advantage during discharge that, since the inlet of the discharge is maximally spaced apart from the product level, entrainment of peels and the like is substantially prevented. On the other hand, a maximal product level is achieved thereby. It is observed in this respect that the attachment of the hollow shaft and the bend takes place by means of a seating 35 welded on the vessel. To said seating there is likewise secured the cylinder 7 adapted for operation of the cover 5.

By the above described combination of suspension of the vessel and the steam supply and discharge, a completely centered steam connecting pipe without bends is possible. As a result, not only less wear on the fittings is achieved, but likewise a quicker steam pressure reduction.

An other major difference relatively to the first embodiment consists in that the grid 11 is affixed to the peeling vessel and the arms 12 are attached to a coupling arm 36 mounted on shaft 13. Thus, only the lower portion of the grid 11 need be designed as grid (for passing condensate), while the other portion may be closed. As a result, a better movement of the products relatively to each other will be achieved, for they can no longer co-rotate with the grid. Besides, since the grid is substantially closed the product is smooth and therefore is not further scraped, so that a substantially lower pollution of the condensing water is produced.

A further modification relatively to the first embodiment is formed in that the shape of the vessel is slightly altered in the sense that the wall portion over which the products move during supply, resp. discharge, is straight and not, as in FIGS. 1 and 2, bottle-neck-shaped. This facilitates the emptying of the peeling vessel.

What I claim is:

1. A method of steam peeling a plant product selected from the group consisting of potatoes, carrots, celery, red beets, Swedish turnips and apples, comprising the steps of:

introducing said plant product to be peeled through a product opening at one end of a substantially cylindrical peeling vessel having a liquid discharge outlet at the other end;

tilting the vessel around a horizontal axis into a normally operating longitudinally inclined position wherein the one end is above the other end to a discharge outlet and product opening;

partitioning the vessel at said other end perpendicular to the longitudinal axis thereof and spaced from the liquid discharge outlet, when the vessel is in the normally operating position, to prevent passage of product to be peeled while allowing condensate to pass therethrough such that the product to be peeled does not lie in the condensate during the application of steam;

applying steam through an access opening in the vessel disposed above the product level while the vessel is in the normally operating position, via a first steam line disposed colinearly with the horizontal tilting axis and a second line connecting the first line to the access opening;

stirring the product during the application of steam by at least one stirring arm disposed above the partitioning and axially along the wall of the vessel and rotating about the longitudinal axis of the vessel to effect the peeling of the plant product;

collecting the condensate below the partitioning and discharging same after the application of the steam; and tilting the vessel from the horizontal axis from the normally operating position until the other end is above the one end and discharging the peeled product through the product opening.

* * * * *